(12) United States Patent
Tain

(10) Patent No.: US 7,812,898 B2
(45) Date of Patent: Oct. 12, 2010

(54) LIGHT SOURCE MODULE, ILLUMINATING APPARATUS AND LIQUID CRYSTAL DISPLAY

(75) Inventor: Ra-Min Tain, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 904 days.

(21) Appl. No.: 11/552,979

(22) Filed: Oct. 26, 2006

(65) Prior Publication Data

US 2007/0047231 A1    Mar. 1, 2007

Related U.S. Application Data

(63) Continuation-in-part of application No. 11/023,692, filed on Dec. 27, 2004, now Pat. No. 7,205,719.

(30) Foreign Application Priority Data

Oct. 2, 2006    (TW) ............................... 95136525 A

(51) Int. Cl.
  *G02F 1/1335*    (2006.01)
  *H01K 1/58*    (2006.01)
  *F21V 33/00*    (2006.01)

(52) U.S. Cl. ........................ 349/61; 313/46; 362/234; 362/612

(58) Field of Classification Search ................. 362/612, 362/632–634, 234; 313/46; 349/61
See application file for complete search history.

(56) References Cited

U.S. PATENT DOCUMENTS

| | | | |
|---|---|---|---|
| 6,608,614 B1 | 8/2003 | Johnson | |
| 6,666,567 B1 | 12/2003 | Feldman et al. | |
| 2007/0019419 A1* | 1/2007 | Hafuka et al. | ............... 362/373 |

* cited by examiner

*Primary Examiner*—David Nelms
*Assistant Examiner*—Nathanael R Briggs
(74) *Attorney, Agent, or Firm*—Jianq Chyun IP Office

(57) ABSTRACT

A light source module including an optical plate and at least one light emitting device is provided. The optical plate includes a heat dissipation core plate and at least one electric circuit layer disposed thereon. The light emitting device is disposed on the optical plate and electrically connected to the electric circuit layer. The light source module has the advantages of simple structure and low cost. An illuminating apparatus including the light source module is also provided to generate a uniform light source. The display quality of a liquid crystal display can further be improved by including the illuminating apparatus to serve as a backlight source of the liquid crystal display.

37 Claims, 9 Drawing Sheets

LIGHT SOURCE MODULE, ILLUMINATING APPARATUS AND LIQUID CRYSTAL DISPLAY

CROSS-REFERENCE TO RELATED APPLICATION

This application is a continuation-in-part of a prior application Ser. No. 11/023,692, filed Dec. 27, 2004 which is now pending and claims the priority benefit of Taiwan application Ser. No. 95136525, filed Oct. 2, 2006, and is now pending. The entirety of each of the above-mentioned patent applications is hereby incorporated by reference herein and made a part of this specification.

BACKGROUND OF THE INVENTION

1. Field of the Invention

The present invention generally relates to a light source module and applications thereof. More particularly, the present invention relates to a low cost light source module having a simple structure and superior light quality, and applications thereof.

2. Description of Related Art

A light source for illuminating an information source is often required in many applications. In particular, liquid crystal displays (LCDs) have become more and more popular in many electronic media. LCDs are commonly adopted in various applications, such as laptop computers, display monitors, video cameras, automatic teller machine displays, displays in avionics, televisions etc. In general, an illuminating apparatus (i.e., a backlight module) is required for the LCDs to illuminate the information to be displayed. A variety of light sources are used in an illuminating apparatus of an LCD, e.g., fluorescent lamps and light emitting diodes (LEDs). While the fluorescent lamps are inexpensive and require no complex control circuitry, they are sometimes inadequate for certain applications that require good color quality and prolonged lamp life time.

Accordingly, LEDs have been proposed for use as light sources, such as illuminating apparatuses for LCDs, for many reasons. The advantages of LED light sources include long life time, ease of replacement, robust mechanical property, and better color quality compared to fluorescent lamps. Certain applications (e.g., avionics) require a specific chromaticity of light emitted from the illuminating apparatus of LCD. However, most commercially available LEDs are made with a limited number of chromaticity choices and their chromaticity may change over time.

An LED light source with a raised LED 100, as shown in FIG. 1, to improve the chromaticity of a combined light was disclosed in U.S. Pat. No. 6,666,567. The raised LED 100 includes an LED diode 101 encased in a package 102 which is raised above the floor 103 of optical cavities. The raised structure permits light to be emitted from the base of the LED. Additionally, reflective protrusions may be placed beneath the raised LED to aid in redirecting the light trajectory. A combination of fluorescent lamps and LEDs were also proposed to form a hybrid light source.

As shown in FIG. 2 and FIG. 3, an LCD backlight 200, which includes a first LED array 201 that provides light with a first chromaticity and a second LED array 202 that provides light with a second chromaticity, was disclosed in another U.S. Pat. No. 6,608,614. The lights emitted from these two LED arrays 201 and 202 are combined through a combining element 301 (e.g., a wave guide) and then projected towards an LCD panel 302. The LED chip normally emits light in a direction which is approximately perpendicular to the chip surface. The directions of light emitted from the first and the second LED arrays are approximately perpendicular and parallel to the panel surface, respectively. A separate combining element 301 is required in this light source. The chromaticity of the combined light can only be adjusted by changing the chromaticity of the second LED array 202 through a control system (not shown).

According to another prior art, a Luxeon side-emitter having packaged LED chips was disclosed, as shown in FIG. 4. The side-emitter may provide good uniformity of combined light but the light intensity is poor. In addition, packaged LED chips normally occupy a large area.

It is known that the majority of lights emitted from LED chips travel in a direction approximately perpendicular to the chip surface. Therefore, the LED chips need to be arranged such that the lights emitted from different LED chips have a chance to be combined and mixed in order to achieve desired chromaticity before they reach a target. Accordingly, the present invention proposes using a less complex and low cost system to achieve high intensity and good color quality.

SUMMARY OF THE INVENTION

Accordingly, the present invention is directed to a low cost light source having simple structure.

The present invention is also directed to a low cost illuminating apparatus capable of providing uniform light source.

The present invention is further directed to a liquid crystal display capable of comprising the above illuminating apparatus to provide a superior display quality.

As embodied and broadly described herein, the present invention provides a light source module comprising an optical plate and at least one light emitting device. The optical plate comprises a heat dissipation core plate and at least one electric circuit layer disposed thereon. The light emitting device is disposed on the optical plate and electrically connected to the electric circuit layer.

A illuminating apparatus applying the aforementioned light source module is also proposed by the present invention, wherein at least one optical plate is mounted on a base plate to provide a light source.

The present invention further provides a liquid crystal display including the aforementioned illuminating apparatus. The liquid crystal display includes a liquid crystal panel and the illuminating apparatus, wherein the illuminating apparatus is assembled with the liquid crystal panel to serve as a displaying light source.

Accordingly, the light emitting device is carried on the optical plate composed of the heat dissipation core plate and the electric circuit layer, and therefore the structure of the light source module can be simplified and the manufacturing cost can be reduced. In addition, the heat dissipation core plate provides a better heat dissipation effect for the light source module, and thus the reliability of the product can be improved. Furthermore, the illuminating apparatus including the light source module provides a superior light intensity and uniformity. The illuminating apparatus can also be applied as the backlight source of the liquid crystal display to provide a good display quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
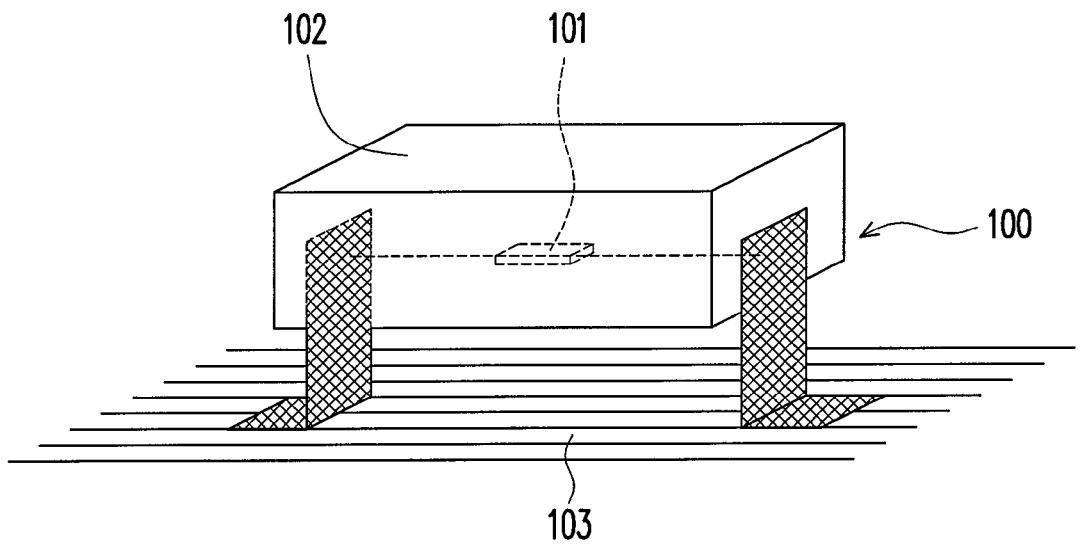
FIG. 1 shows a conventional raised LED structure.
Figure 2:
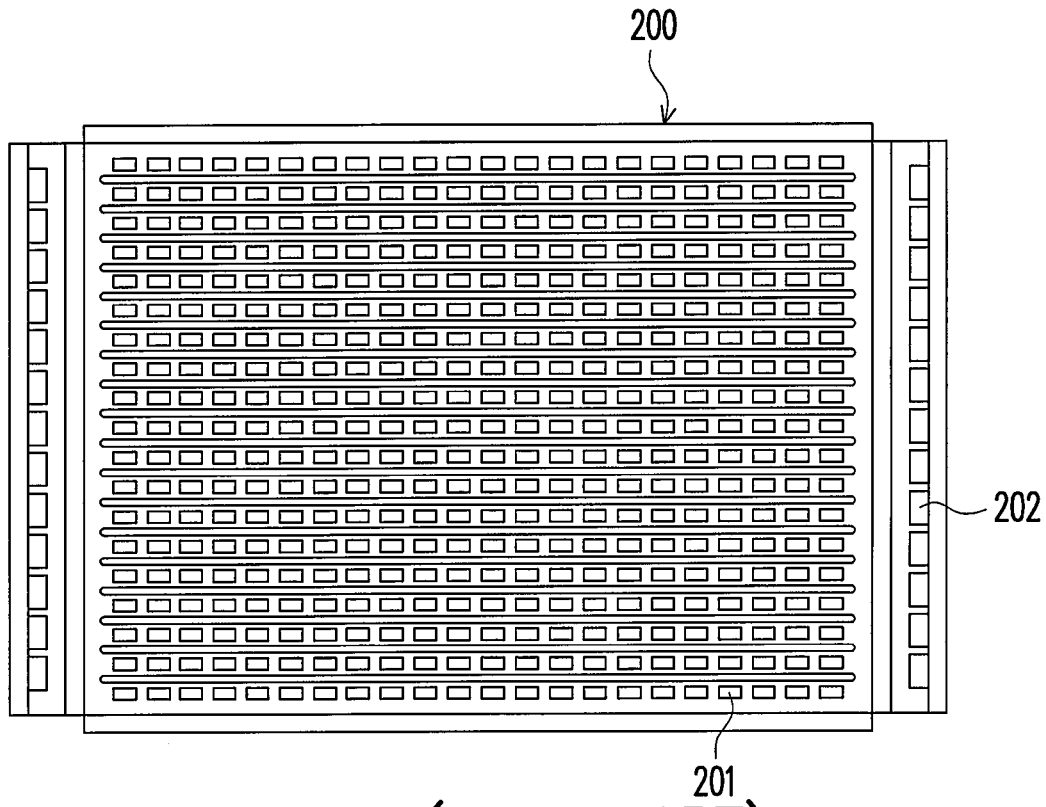
FIG. 2 shows a conventional LED-based LCD backlight.
Figure 3:
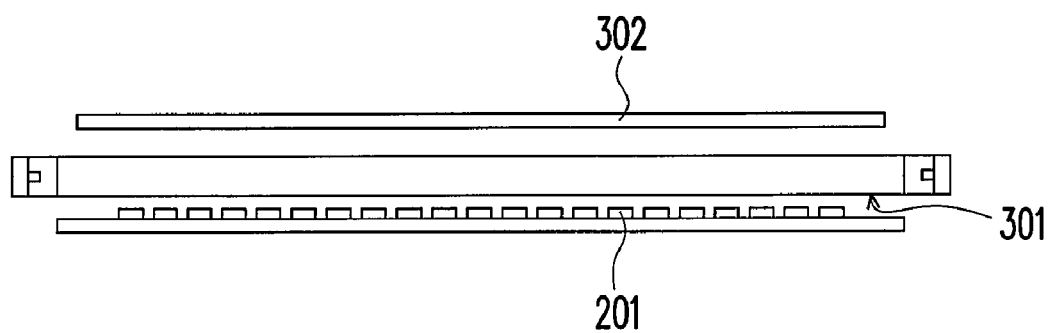
FIG. 3 shows a cross-sectional view of the LCD backlight shown in FIG. 2.
Figure 4:
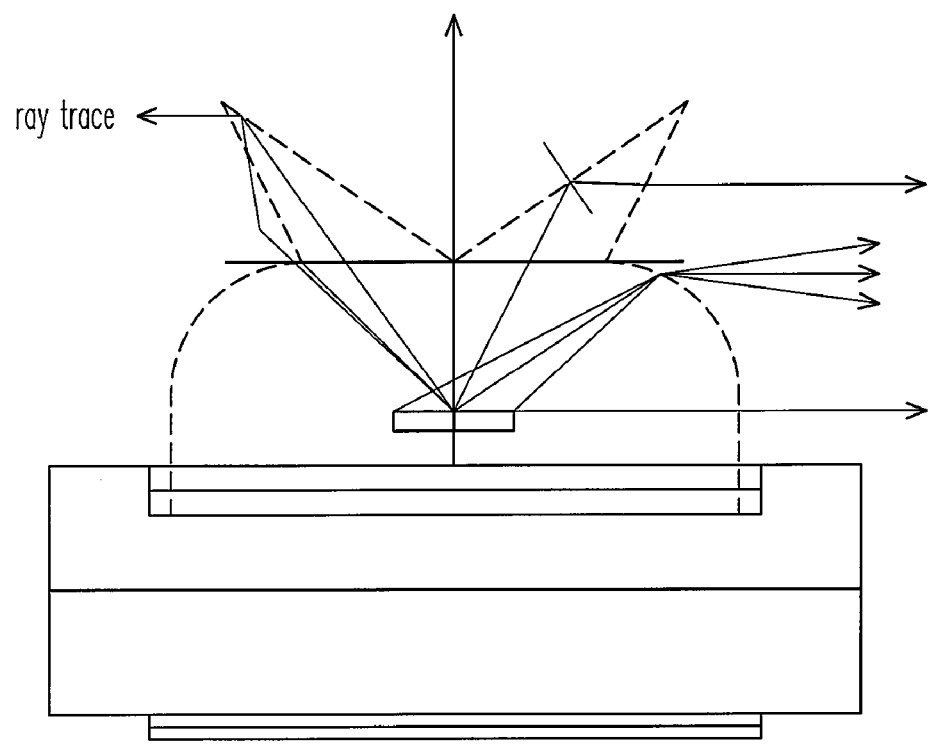
FIG. 4 shows a conventional Luxeon side-emitter.

Reference will now be made in detail to the present embodiments of the invention, examples of which are illustrated in the accompanying drawings. Wherever possible, the same reference numbers are used in the drawings and the description to refer to the same or like parts.

A low cost light source module with simple structure and good light quality is proposed in the present invention. In the light source module, an optical plate comprising a heat dissipation core plate and an electric circuit layer is used to carry at least one light emitting device. The electric circuit layer can be easily fabricated and can be integrated with the package of the light emitting device to electrically connect the light emitting device to an external circuitry. Thus, the manufacturing process can be simplified. In addition, the heat dissipation core plate contributes to the heat dissipation of the light source module by transmitting heat from the light emitting device to the circumstance during operation. Moreover, the heat dissipation core plate may have at least one inclined plane to modify directions of lights from the light emitting device for improving the light quality of the light source module.

The present invention provides an illuminating apparatus including at least one aforementioned light source module, which carries the light source module on a base plate thereof. The light emitting devices on the light source modules can provide a light source. Furthermore, the light source can be applied in a liquid crystal display to serve as a display light source for the liquid crystal panel. Since the illuminating apparatus provides good light quality, the display quality of the liquid crystal display can also be improved. Contents and features of the present invention are illustrated in the following embodiments accompanying drawings.

Figure 5A:
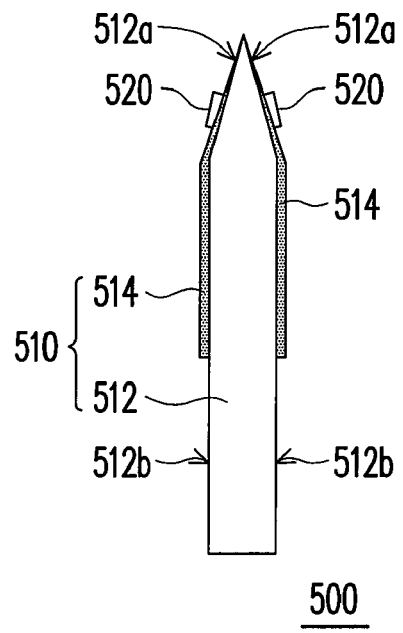
FIGS. 5A and 5B respectively illustrates a light source module according to an embodiment of the present invention.
Figure 5B:
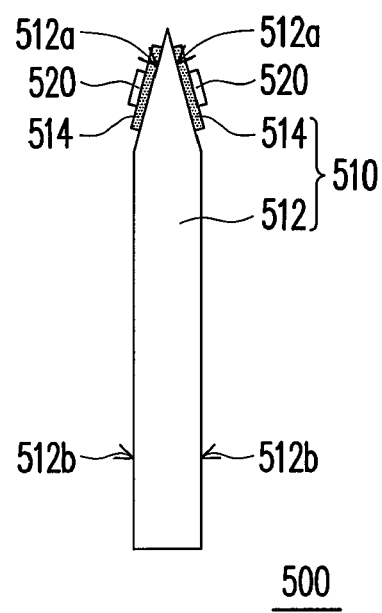

FIGS. 5A and 5B respectively illustrates a light source module according to an embodiment of the present invention. As shown in FIGS. 5A and 5B, the light source module 500 mainly includes an optical plate 510 and at least one light emitting device 520. The optical plate 510 comprises a heat dissipation core plate 512 and at least one electric circuit layer 514 disposed thereon. The light emitting device 520 is disposed on the optical plate 510 and electrically connected to the electric circuit layer 514 to communicate with the external circuitry.

The aforementioned heat dissipation core plate 512 is mainly used for carrying the electric circuit layer 514 and the light emitting device 520 and further provides heat dissipation effect. The material of the heat dissipation core plate 512 can be selected from the group consisting of a dielectric material, an electrical conductor, and a thermal conductor. Otherwise, general well-known heat dissipation devices may be used to serve as the heat dissipation core plate 512. For example, the heat dissipation core plate 512 may be a flatted heat pipe which has a hollow chamber filled with heat dissipation medium to achieve higher heat dissipation effect.

Each side of the heat dissipation core plate 512 has an electric circuit layer 514 and a light emitting device 520, wherein the light emitting device 520 is electrically connected to the corresponding electric circuit layer 514. It is noted that the light source module 500 illustrated in FIGS. 5A and 5B is exemplary, which is not used to limit the number and the arrangement of the electric circuit layer 514 and the light emitting device 520. Practically, referring to FIG. 5C, multiple light emitting devices 520 arranged in specific distributions are disposed at the same side of optical plate 510.

The light emitting device(s) 520 suitable for outputting different color lights can be applied to attain full color light. Specifically, design of a single light emitting device 520 capable of emitting different color lights or multiple light emitting devices 520 with different colors is practicable in the present invention.

In order to modify directions of lights from the light emitting device 520, at least one inclined plane 512a is formed on an edge of the heat dissipation core plate 512 to carry the light emitting device 520. In the embodiment as shown in FIGS. 5A and 5B, the heat dissipation core plate 512 has two intersected inclined planes 512a at its edge, wherein each inclined plane 512a has at least one light emitting device 520 disposed thereon.

Figure 5C:
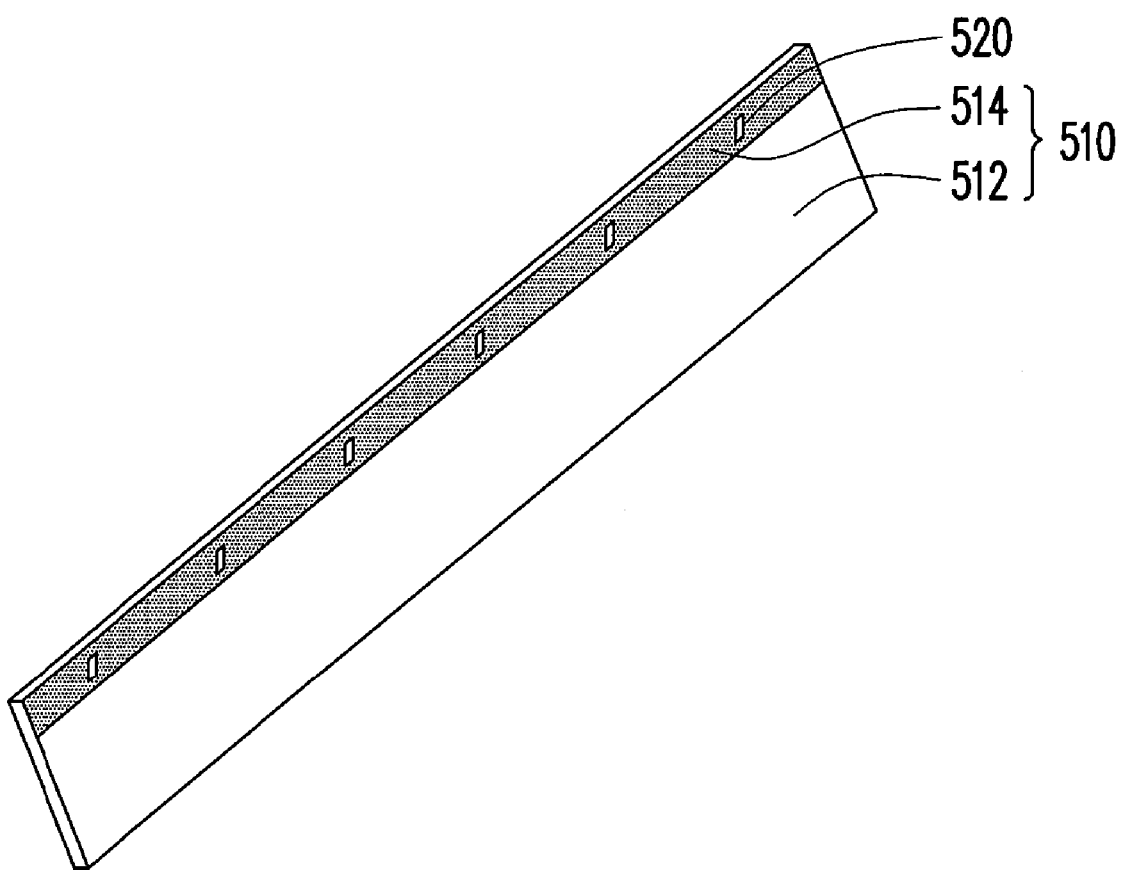
FIG. 5C shows a light source module with a plurality of light emitting devices according to an embodiment of the present invention.

However, there is no limit on the number or the arrangement of the inclined plane 512a. In addition, a curved surface can be formed to replace the inclined plane. Alternatively, no inclined plane or curved surface may be formed on the heat dissipation core plate 512 as shown in FIG. 5C.

The position of the electric circuit layer 514 depends on the distribution of the light emitting device 520 and the practical design. For example, the electric circuit layers 514 of FIG. 5A cover the inclined planes 512a and part of two opposite parallel planes 512b of the heat dissipation core plate 512. Besides, the electric circuit layers 514 of FIG. 5B cover only the inclined planes 512a of the heat dissipation core plate 512. In addition, the electric circuit layer 514 can be different types of circuit substrates, such as a printed circuit board directly attached on the heat dissipation core plate 512. Certainly, the electric circuit layer 514 may also be a multi-layer structure comprising at least one dielectric layer and at least one electrical conductive layer, which is formed on the heat dissipation core plate 512 by build-up process. The material of the dielectric layer can be selected from the group consisting of oxide, a ceramic material and a combination thereof. The material of the electrical conductive layer may be a metal conductive material such as copper (Cu) or aluminum (Al).

Figure 6A:
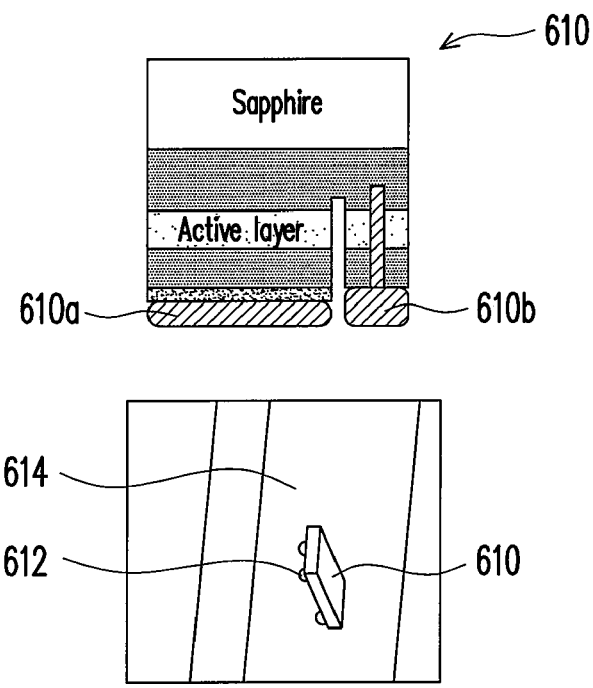
FIGS. 6A~6C sequentially illustrate different types of bare LED chips and their applicable bonding structures.
Figure 6B:
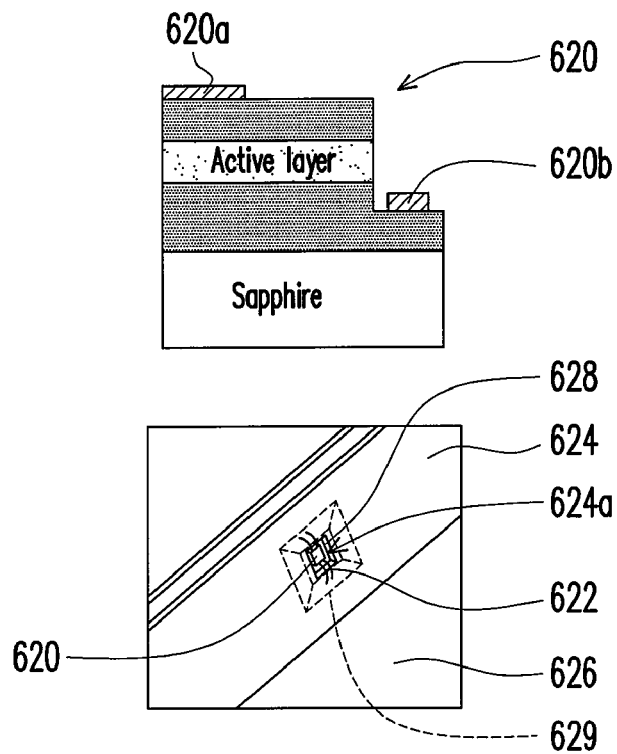
Figure 6C:
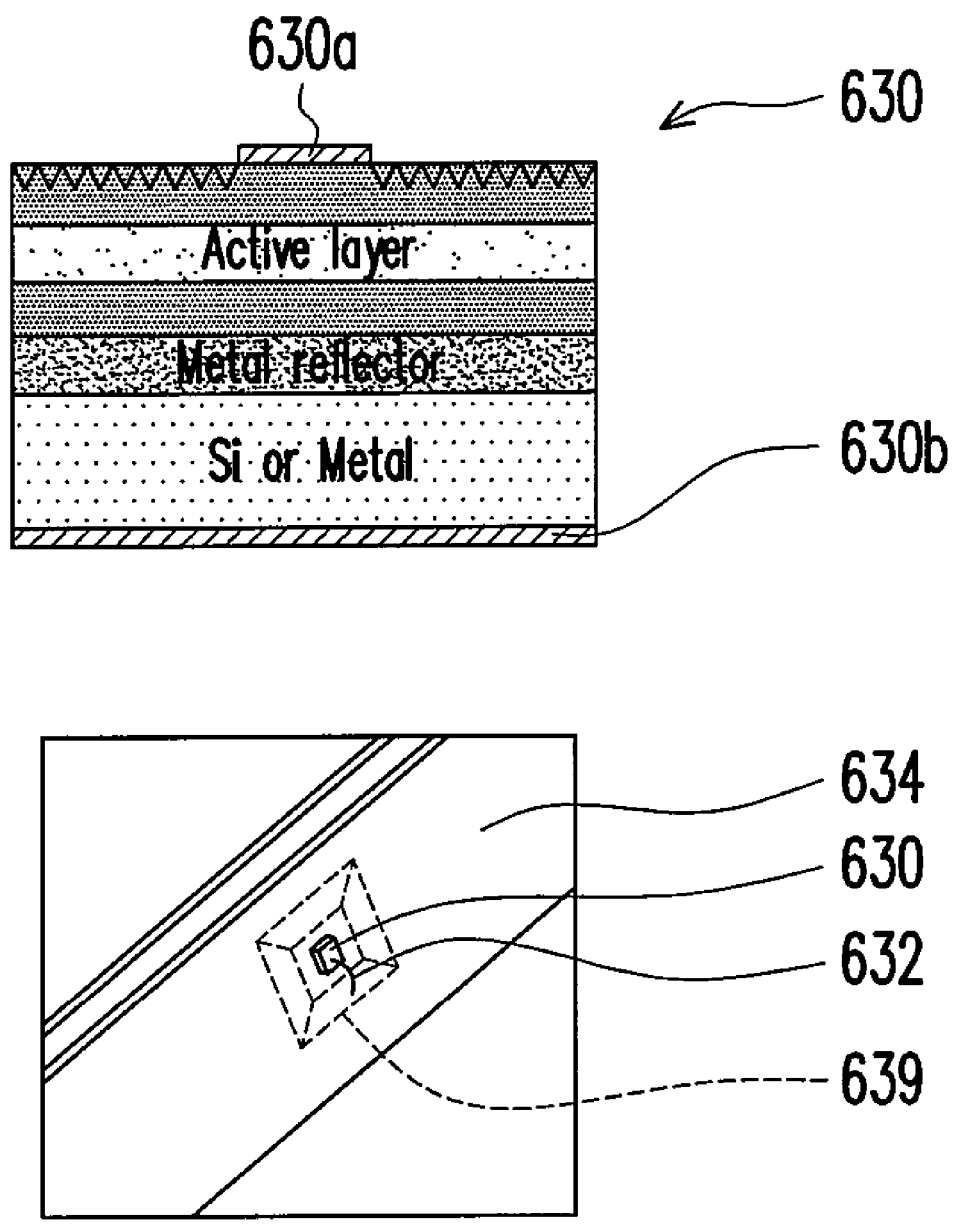

The light emitting device 520 may be a bare LED chip. According to the types of the bare LED chip which can be connected to the electric circuit layer 514 by different bonding techniques, such as flip-chip bonding technique or wire bonding technique. FIGS. 6A~6C sequentially illustrate different types of bare LED chips and their applicable bonding structures.

Referring to FIG. 6A, the bare LED chip 610 has a first electrode 610a and a second electrode 610b at the same side, which are bonded to the contacts (not shown) of the electric circuit layer 614 via conductive material 612, such as a plurality of conductive bumps, conductive paste or solder, by performing the flip-chip bonding technique. Moreover, in the case of using the bumps 612 to connect the bare LED chip 610 with the electric circuit layer 614, an underfill can further be formed between the bare LED chip 610 and the electric circuit layer 614 to enhance the reliability of the bumps 612. This kind of bonding method is suitable for the electric circuit layer 614 with high integration.

FIG. 6B illustrates the bare LED chip 620 connecting to the electric circuit layer 624 by performing the edge wiring bonding technique. The bare LED chip 620 has a first electrode 620a and a second electrode 620b at the same side, which are respectively connected to the contacts (not shown) of the electric circuit layer 624 via a plurality of wires 622. It is noted that the electric circuit layer 624 of the embodiment further has a cavity 624a, and the bare LED chip 620 is disposed within the cavity 624a via adhesive paste (not shown) in order to adjust the level of the bare LED chip 620 for wire bonding. Furthermore, the cavity 624a may expose the heat dissipation core plate 626 and the bare LED chip 620 can be directly disposed on the surface of the heat dissipation core plate 626 to improve the heat dissipation effect. Herein, a preferred design of the present invention is to dispose the corresponding coupling electrodes (i.e., the aforementioned contacts) for the bare LED chip 620 on the electric circuit layer 624, and the heat dissipation core plate 626 is not used as an electrode. By the connection of the electric circuit layer 624, multiple bare LED chips 620 can be electrically connected in serial to overcome the disadvantages of higher driving current and over control. Certainly, the present invention doesn't exclude the possibility of the heat dissipation core plate 626 to serve as an electrode. Additionally, the inner surface of the cavity 624a may be covered by a light reflecting layer 628 to improve the light intensity of the overall light source module. After the wire bonding process, a transparent material 629 can be formed to encapsulate the bare LED chip 620 and the wires 622. The transparent material may be selected from the group consisting of epoxy, silicone and a combination thereof.

FIG. 6C illustrates the bare LED chip 630 connecting to the electric circuit layer 634 by performing the center wiring bonding technique. The bare LED chip 630 has a top electrode 630a and a bottom electrode 630b, wherein the bare LED chip 630 is bonded to a contact (not shown) of the electric circuit layer 634 via the bottom electrode 630b, and the top electrode 630a is connected to another contact (not shown) of the electric circuit layer 634 via wire 632 by wire bonding. The bottom electrode 630b may be connected to the contact (not shown) of the electric circuit layer 634 via conductive paste or solder. After the wire bonding process, a transparent material 639 can be used to encapsulate the bare LED chip 630 and the wire 632. The transparent material may be selected from the group consisting of epoxy, silicone and a combination thereof.

Apart from using the bare LED chip as the light emitting device, an LED package or other element suitable for emitting light may also be used as the light emitting device and connected to the electric circuit layer. However, the selection of the light emitting device may depend on design and practical need. The structure and bonding method should be apparent to those skilled in the art, and thus the detailed description is omitted.

Figure 7A:
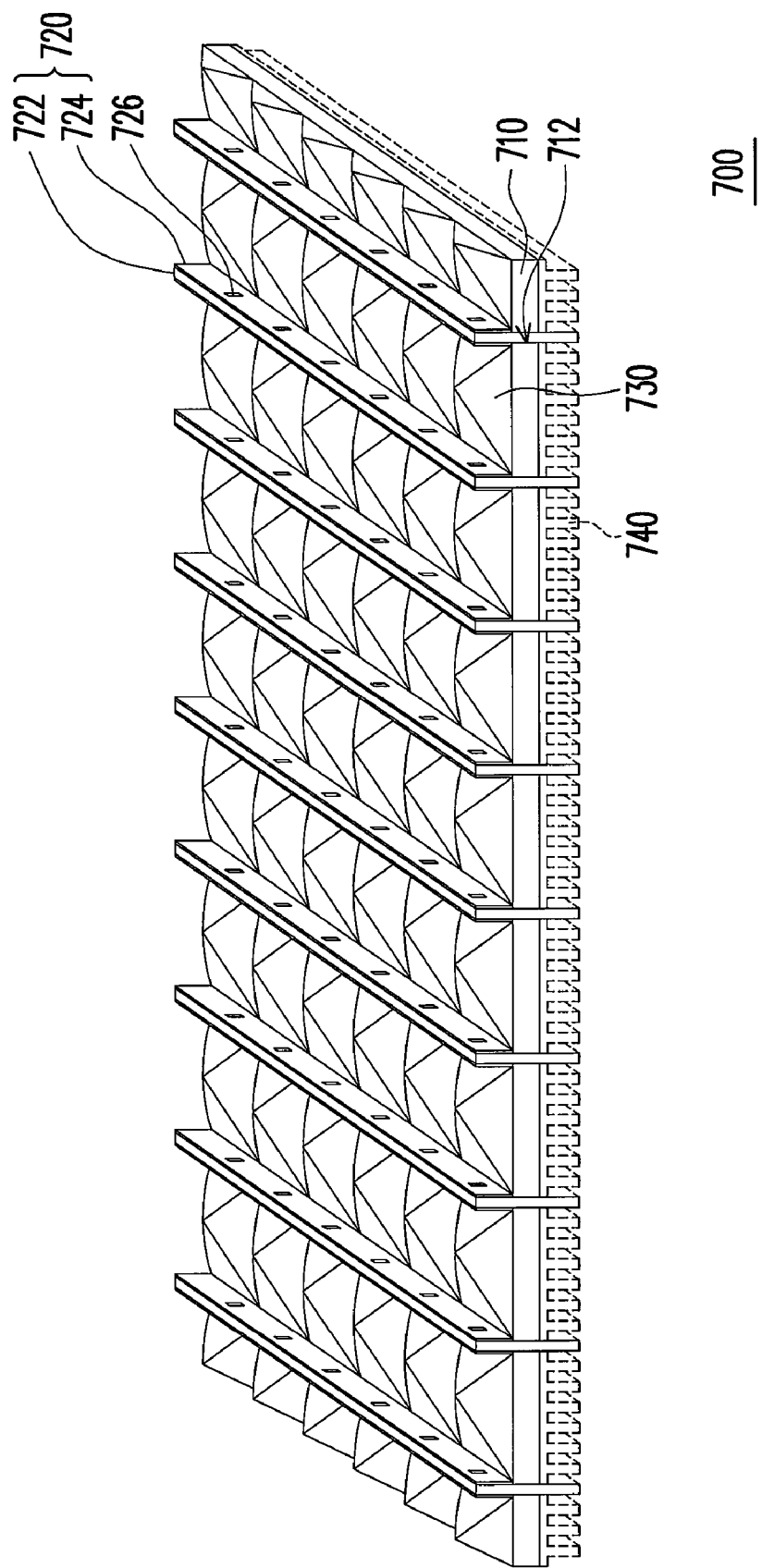
FIG. 7A shows the illuminating apparatus according to an embodiment of the present invention.
Figure 7B:
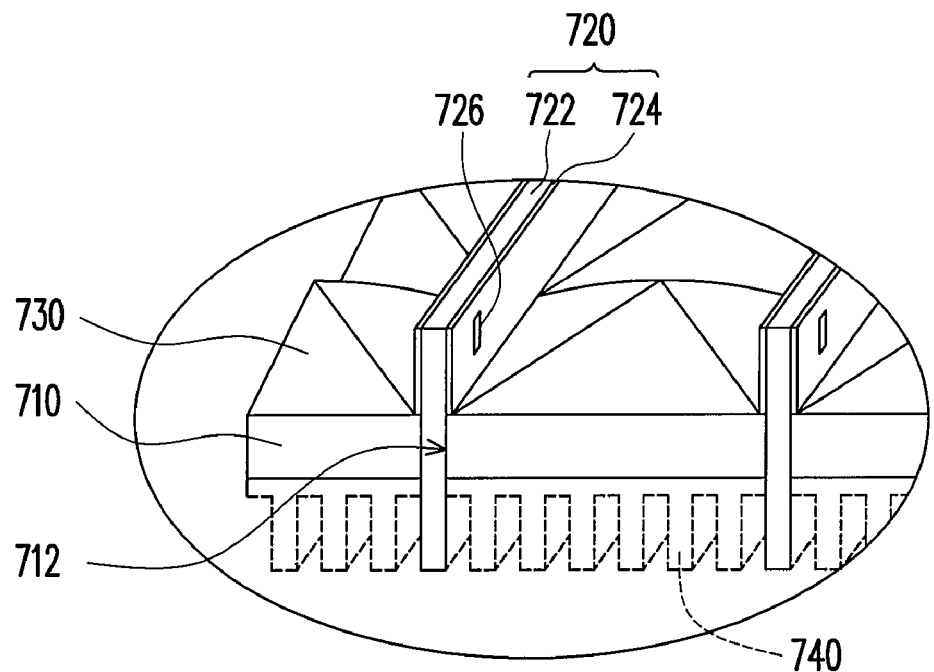
FIG. 7B is a partial view of the illuminating apparatus shown in FIG. 7A.

An illuminating apparatus including at least one aforementioned light source module is proposed in the present invention. FIG. 7A shows the illuminating apparatus according to an embodiment of the present invention, while FIG. 7B is a partial view of the illuminating apparatus. It is noted that the illuminating apparatus of the embodiment includes a plurality of light source modules. However, in another embodiment of the present invention may further propose an illuminating apparatus with a single light source module. As shown in FIGS. 7A and 7B, the illuminating apparatus 700 comprises a base plate 710 and a plurality of optical plate 720, wherein the optical plate 720 are mounted on the base plate 710. The structure of each optical plate 720 has been described in the aforementioned embodiments, and therefore detail description thereof is not repeated herein. Additionally, the design of the inclined plane on the heat dissipation core plate 722, the number and the arrangement of the light emitting devices 726, the material of the elements, and the bonding manners between the light emitting devices 726 and their corresponding electric circuit layer 724 can also be referred to the above embodiments.

Referring to FIGS. 7A and 7B, at least one optical protrusion 730 can be formed between two adjacent optical plates 720 to improve the intensity of the output light. Multiple optical protrusions 730 are shown herein. The shape of the optical protrusions 730 may be pyramidal shape, conic shape, parabolic shape, or semi-spherical shape. These optical protrusions 730 are capable of reflecting the light emitted from the light emitting devices 726 in specific directions. Moreover, for combining the base plate 710 with the optical plates 720, the base plate 710 may have a plurality of slots 712 and the optical plates 720 are inserted into the slots 712.

The illuminating apparatus 700 of the embodiment further comprises a heat sink 740 disposed at another side of the base plate 710 in opposite to the light emitting devices 726, wherein the optical plates 720 contact the heat sink 740. Moreover, the optical plates 720 can further penetrate through the base plate 710 to contact the heat sink 740 to achieve higher heat dissipation efficiency.

Figure 7C:
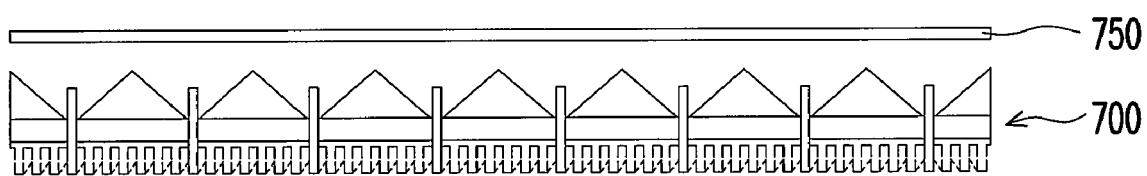
FIG. 7C is a cross-sectional view of the illuminating apparatus shown in FIG. 7A

The illuminating apparatus 700 of the embodiment can further include a controller (not shown) which electrically connected to the light emitting devices 726 through the corresponding electric circuit layers 724 of the optical plates 720. The controller controls the operation of the light emitting devices 726, such as providing power source to the light emitting devices 726, controlling the brightness of the light emitting devices 726, and adjusting the light mixing effect of the light emitting devices 726. Further, referring to the cross-sectional view of the illuminating apparatus 700 in FIG. 7C, the illuminating apparatus 700 may further include an optical element 750 for guiding the lights emitted from the light emitting devices 726 (as shown in FIGS. 7A and 7B) to make the light output from the illuminating apparatus 700 more uniform and control the direction of the light output. The optical element may be a light diffuser or a wave guide.

Figure 8:
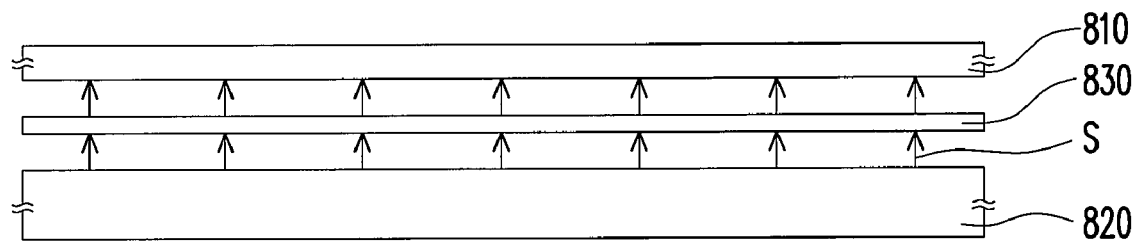
FIG. 8 shows a liquid crystal display including the aforementioned illuminating apparatus according to an embodiment of the present invention.

FIG. 8 shows a liquid crystal display including the aforementioned illuminating apparatus according to the present invention. Referring to FIG. 8, the liquid crystal display 800 comprises a liquid crystal panel 810 and an illuminating apparatus 820. The liquid crystal panel 810 is disposed over the illuminating apparatus 820 to receive the light source S from the illuminating apparatus 820 and display the image information. The detailed descriptions of structure of the illuminating apparatus 820 are being described in the aforementioned embodiments, and therefore they are not repeated herein. In addition, the liquid crystal display 800 may further comprise an optical film 830 disposed between the liquid crystal panel 810 and the illuminating apparatus 820 to improve the quality of the light source. The optical film 830 may be selected from the group consisting of a diffusion plate, a prism plate, a brightness enhanced plate and a combination thereof.

Figure 9:
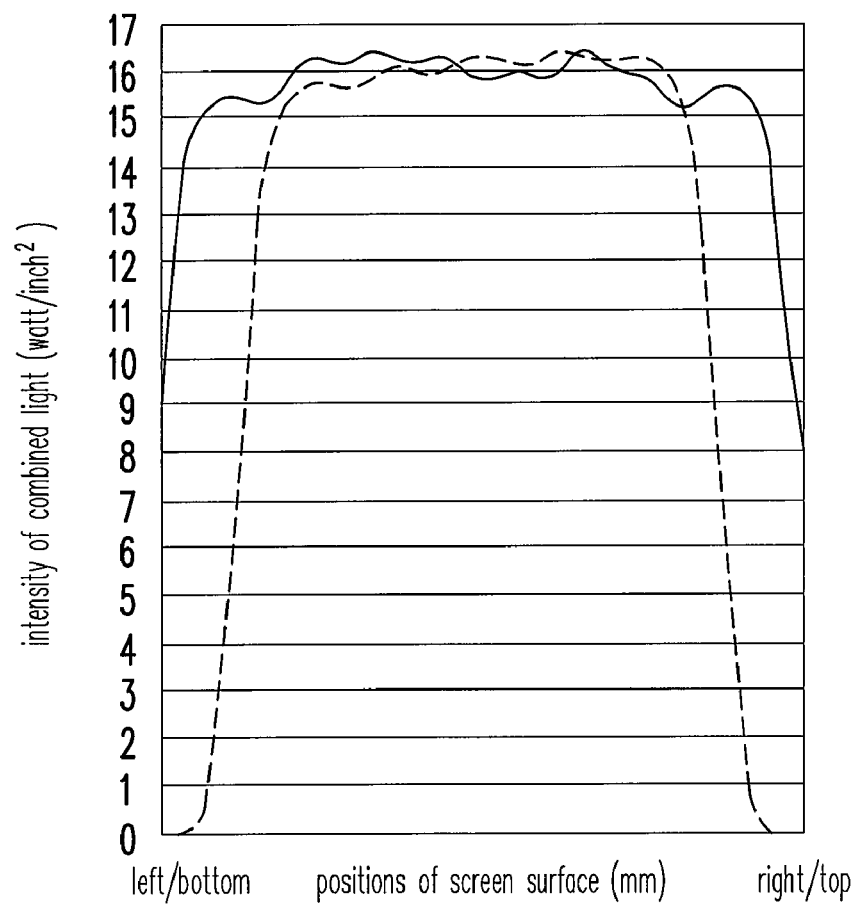
FIG. 9 shows the intensity of the combined light from left/bottom to right/top of the screen surface according to an embodiment of the present invention.

FIG. 9 shows the intensity of the combined light from left/bottom to right/top of the screen surface according to the present invention. The horizontal axis represents the location on the screen. The solid line represents the horizontal component of the light intensity and the dashed line represents the vertical component of the light intensity. In the illuminating apparatus of the present invention, the arrangement of the light emitting devices and the light output directions can be modified by the inclined plane formed on the heat dissipation core plate or the optical protrusions between the adjacent optical plates. Accordingly, a better uniformity and higher intensity of the combined lights with desired chromaticity are achieved in both horizontal and vertical directions. Therefore, the display quality of the liquid crystal display is improved.

In summary, the light source module, the illuminating apparatus and the liquid crystal display of the present invention have at least the following features and advantages. The light emitting device is carried by the optical plate comprising the heat dissipation core apparatus and the electric circuit layer, therefore the structure is simple and the manufacturing cost is low. In addition, the electric circuit layer is easily fabricated and capable of integrating with the package of the light emitting device to electrically connect the light emitting device to the external circuitry and thus simplify the manufacturing process. Moreover, the heat dissipation core plate contributes to the heat dissipation of the light source module by transmitting heat from the light emitting device to the circumstance during operation. The reliability of the product is improved. Further, the heat dissipation may have at least one inclined plane to modify directions of lights from the light emitting device for improving the light quality of the light source module. Furthermore, the arrangement of the optical protrusions can modify the directions of the lights emitted from the light emitting devices and thus enhance the quality of the output light. Additionally, the illuminating apparatus serves as a better light source providing uniform and high intensity combined lights in both horizontal and vertical directions on the screen. The display quality of the liquid crystal display is therefore improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source module, comprising:
  an optical plate, comprising:
    a heat dissipation core plate, wherein an edge of the heat dissipation core plate has two inclined planes intersecting with each other;
    two electric circuit layers, respectively disposed on the two inclined planes of the heat dissipation core plate, wherein each of the electric circuit layers is a printed circuit board or a multi-layer structure comprising at least one dielectric layer and at least one electrical conductive layer; and
    two light emitting devices, respectively disposed over the two inclined planes and electrically connected to the two electric circuit layers.

2. The light source module according to claim 1, wherein each of the light emitting devices is a bare LED chip.

3. The light source module according to claim 1, wherein each of the electric circuit layers has a cavity for containing the bare LED chip.

4. The light source module according to claim 3, wherein the cavity exposes the heat dissipation core plate and the bare LED chip is disposed on the surface of the heat dissipation core plate.

5. The light source module according to claim 3, wherein each of the electric circuit layers comprises a light reflecting layer which is disposed over the inner surface of the cavity.

6. The light source module according to claim 2, further comprising a transparent material disposed on the optical plate to encapsulate the bare LED chip.

7. The light source module according to claim 1, wherein the heat dissipation core plate is a flatted heat pipe.

8. An illuminating apparatus, comprising:
  a base plate;
  at least one optical plate, mounted on the base plate, wherein the optical plate comprises:
    a heat dissipation core plat, wherein an edge of the heat dissipation core plate has two inclined planes intersecting with each other;
    two electric circuit layers, respectively disposed on the two inclined planes of the heat dissipation core plate, wherein each of the electric circuit layers is a printed circuit board or a multi-layer structure comprising at least one dielectric layer and at least one electrical conductive layer; and
    two light emitting device devices, respectively disposed over the two inclined planes and electrically connected to the two electric circuit layers.

9. The illuminating apparatus according to claim 8, wherein each of the light emitting devices is a bare LED chip.

10. The illuminating apparatus according to claim 8, wherein each of the electric circuit layers has a cavity for containing the bare LED chip.

11. The illuminating apparatus according to claim 10, wherein the cavity exposes the heat dissipation core plate and the bare LED chip is disposed on the surface of the heat dissipation core plate.

12. The illuminating apparatus according to claim 10, wherein each of the electric circuit layers comprises a light reflecting layer which is disposed over the inner surface of the cavity.

13. The illuminating apparatus according to claim 9, further comprising a transparent material disposed on the optical plate to encapsulate the bare LED chip.

14. The illuminating apparatus according to claim 8, wherein the heat dissipation core plate is a flatted heat pipe.

15. The illuminating apparatus according to claim 8, further comprising at least one optical protrusion disposed between two adjacent optical plates.

16. The illuminating apparatus according to claim 15, wherein the shape of the optical protrusion includes pyramidal shape, conic shape, parabolic shape, or semi-spherical shape.

17. The illuminating apparatus according to claim 8, wherein the base plate has at least one slot and the optical plate is inserted into the slot.

18. The illuminating apparatus according to claim 8, further comprising a heat sink disposed at another side of the base plate in opposite to the light emitting device, wherein the optical plate contacts the heat sink.

19. The illuminating apparatus according to claim 18, wherein the optical plate penetrates through the base plate to contact the heat sink.

20. The illuminating apparatus according to claim 8, further comprising a controller electrically connected to the light emitting device through the electric circuit layer for driving the light emitting device.

21. The illuminating apparatus according to claim 8, further comprising an optical element for guiding the light emitted from the light emitting device.

22. The illuminating apparatus according to claim 21, wherein the optical element comprises a light diffuser or a wave guide.

23. A liquid crystal display, comprising:
a liquid crystal panel;
an illuminating apparatus assembled with the liquid crystal panel to provide a displaying light source for the liquid crystal panel, the illuminating apparatus comprising:
a base plate;
at least one optical plate, mounted on the base plate, wherein the optical plate comprises:
a heat dissipation core plate, wherein an edge of the heat dissipation core plate has two inclined planes intersecting with each other;
two electric circuit layers, respectively disposed on the two inclined planes of the heat dissipation core plate, wherein each of the electric circuit layers is a printed circuit board or a multi-layer structure comprising at least one dielectric layer and at least one electrical conductive layer; and
two light emitting devices, respectively disposed over the two inclined planes and electrically connected to the two electric circuit layers.

24. The liquid crystal display according to claim 23, wherein each of the light emitting devices is an bare LED chip.

25. The liquid crystal display according to claim 23, wherein each of the electric circuit layers has a cavity for containing the bare LED chip.

26. The liquid crystal display according to claim 25, wherein the cavity exposes the corresponding heat dissipation core plate and the bare LED chip is disposed on the surface of the heat dissipation core plates.

27. The liquid crystal display according to claim 25, wherein each of the electric circuit layers comprises a light reflecting layer which is disposed over the inner surface of the cavity.

28. The liquid crystal display according to claim 24, further comprising a transparent material disposed on the optical plate to encapsulate the bare LED chip.

29. The liquid crystal display according to claim 23, wherein the heat dissipation core plate is a flatted heat pipe.

30. The liquid crystal display according to claim 23, further comprising at least one optical protrusion disposed between two adjacent optical plates.

31. The liquid crystal display according to claim 30, wherein the shape of the optical protrusion includes pyramidal shape, conic shape, parabolic shape, or semi-spherical shape.

32. The liquid crystal display according to claim 23, wherein the base plate has at least one slot and the optical plate is inserted into the slot.

33. The liquid crystal display according to claim 23, further comprising a heat sink disposed at another side of the base plate in opposite to the light emitting device, wherein the optical plate contacts the heat sink.

34. The liquid crystal display according to claim 33, wherein the optical plate penetrates through the base plate to contact the heat sink.

35. The liquid crystal display according to claim 23, further comprising a controller electrically connected to the light emitting device through the electric circuit layer for driving the light emitting device.

36. The liquid crystal display according to claim 23, further comprising at least one optical film disposed between the liquid crystal panel and the illuminating apparatus.

37. The liquid crystal display according to claim 36, wherein the optical film is selected from the group consisting of a diffusion plate, a prism plate, a brightness enhanced plate and a combination thereof.

* * * * *